(12) United States Patent
Arajs et al.

(10) Patent No.: US 6,915,522 B2
(45) Date of Patent: Jul. 5, 2005

(54) SYSTEM AND METHOD TO SYNCHRONIZE TWO OR MORE OBJECT MANAGEMENT SYSTEMS

(75) Inventors: Roland L Arajs, San Jose, CA (US); Layne Miller, Campbell, CA (US); Robert Petri, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 525 days.

(21) Appl. No.: 10/055,528

(22) Filed: Jan. 23, 2002

(65) Prior Publication Data

US 2003/0140177 A1 Jul. 24, 2003

(51) Int. Cl.$^7$ ................................................. G06F 9/46
(52) U.S. Cl. ........................... 719/316; 709/223; 707/8; 718/104
(58) Field of Search .............................. 719/315, 316, 719/223, 224; 707/8, 103, 201; 718/100–104; 709/223, 224

(56) References Cited

U.S. PATENT DOCUMENTS

| | | | | |
|---|---|---|---|---|
| 5,339,427 A | * | 8/1994 | Elko et al. ................ | 718/103 |
| 5,390,328 A | * | 2/1995 | Frey et al. ................ | 719/315 |
| 5,729,688 A | * | 3/1998 | Kim et al. ................ | 709/226 |
| 5,737,600 A | * | 4/1998 | Geiner et al. ............. | 707/200 |
| 5,742,830 A | * | 4/1998 | Elko et al. ............... | 710/240 |
| 2004/0019898 A1 | * | 1/2004 | Frey et al. ................ | 719/330 |

* cited by examiner

Primary Examiner—Lewis A. Bullock, Jr.
(74) Attorney, Agent, or Firm—Pillsbury Winthrop LLP

(57) ABSTRACT

A distributed reader and writer's lock to synchronize object management systems is disclosed. The purpose of the lock is to control access to information that is shared by corresponding object management system components on multiple object management systems. An object management system is a computer-based system for storing, naming, and manipulating objects. One lock is created for each object management system component associated with a particular service within the system. The locks communicate over an interface definition language interface. The reader/writer's lock is created by a remote component synchronization module, which acts as an agent for the object management system component. The lock exposes functions to request or release a write lock and to request or release a read lock.

11 Claims, 8 Drawing Sheets

SYSTEM AND METHOD TO SYNCHRONIZE TWO OR MORE OBJECT MANAGEMENT SYSTEMS

BACKGROUND

1. Technical Field

Embodiments described herein are directed to a distributed reader and writer's lock to control access to information shared by corresponding object management system components on multiple object management systems. An object management system is a computer-based system for storing, naming, and manipulating objects. One lock is created for each object management system component that is associated with a particular service in the system. The locks communicate with an interface definition language or similar language.

2. Related Art

At present, multiple processes are synchronized on a single network processor running the Intel® Internet Exchange Architecture ("IXA") object management system. Intel® IXA is a packet processing architecture that provides a foundation for software portability across multiple generations of network processors. Intel® IXA focuses on Intel® network processors and is based on microengine technology, the Intel® XScale™ microarchitecture and the Intel® IXA Hardware Abstraction Layer.

Through Intel® IXA, a greater choice of standards-based, high performance communications building blocks is made available. These building blocks provide faster time-to-market, greater design flexibility and extended time-in-market for next-generation networking solutions. Intel® IXA empowers more rapid deployment of differentiated, reliable and intelligent services for the converged Internet Protocol network, while maximizing return on capital investment.

There exists, however, a legitimate business need for an approach which provides an object management messaging system that allows tasks and high-level programming frameworks such as the Active Computing Element ("ACE") to send messages to one another on multiple network processors in the same manner as they would on a single network processor. Such an approach is beneficial for users who intend to write IXA applications to run on multiple network processors.

In addition, with such an advancement in the field, users who develop applications for a single network processor will be able to upgrade to using several processors without having to rewrite any of the object management system messaging code. This approach is not limited to Intel® architectures; it may also be implemented on other non-Intel® related architectures.

BRIEF DESCRIPTION OF THE DRAWINGS

A detailed description of embodiments of the invention will be made with reference to the accompanying drawings, wherein like numerals designate corresponding parts in the several figures.

DETAILED DESCRIPTION

The following paragraphs describe a distributed reader and writer's lock 100 for synchronizing object management systems. An object management system is a computer-based system for storing, naming, and manipulating objects. The distributed reader and writer's lock 100 is one component in the synchronization system of a multiple object management system. The purpose of the distributed reader and writer's lock 100 is to control access to information shared by corresponding object management system components 140 on multiple object management systems. One distributed reader and writer's lock 100 is created for each object management system component 140 associated with a particular service within the system.

Figure 1:
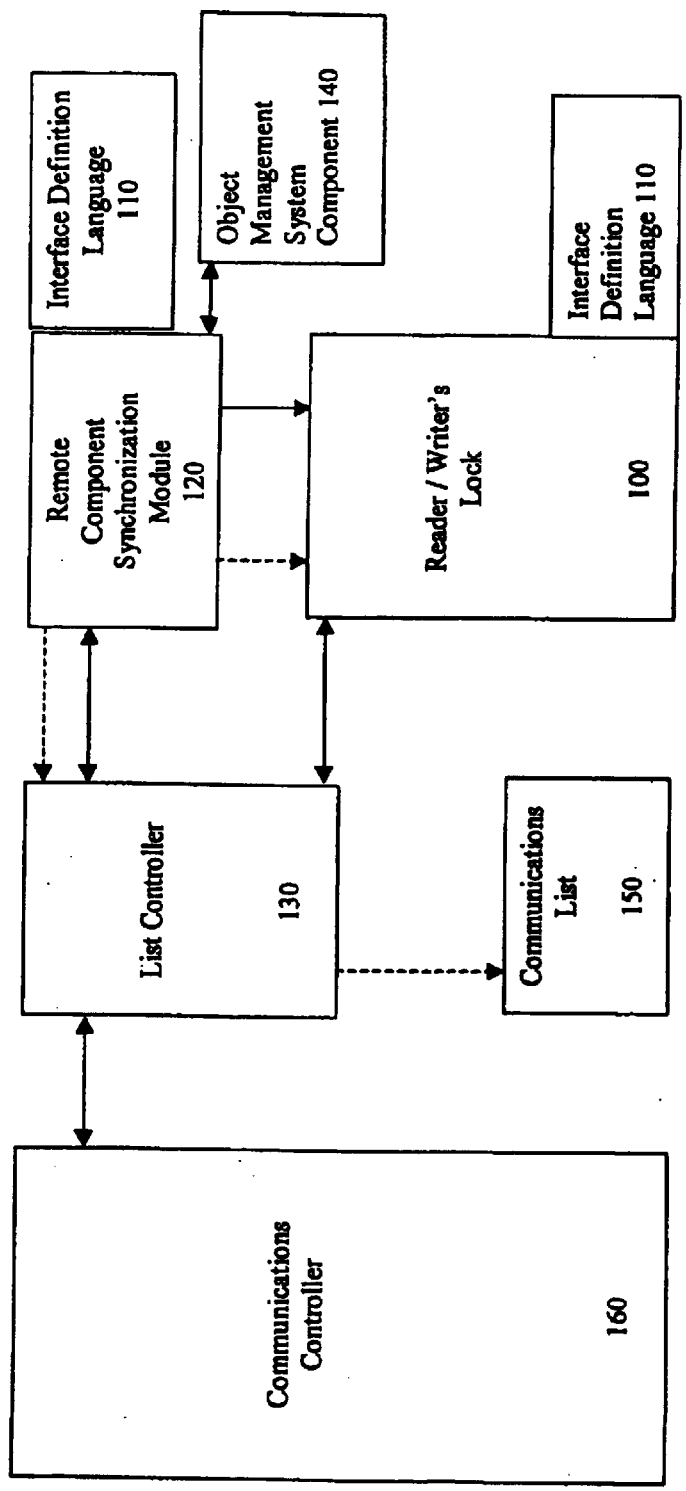
FIG. 1 is a diagram of the synchronization blocks on a single object management system, according to an embodiment of the present invention.
Figure 2:
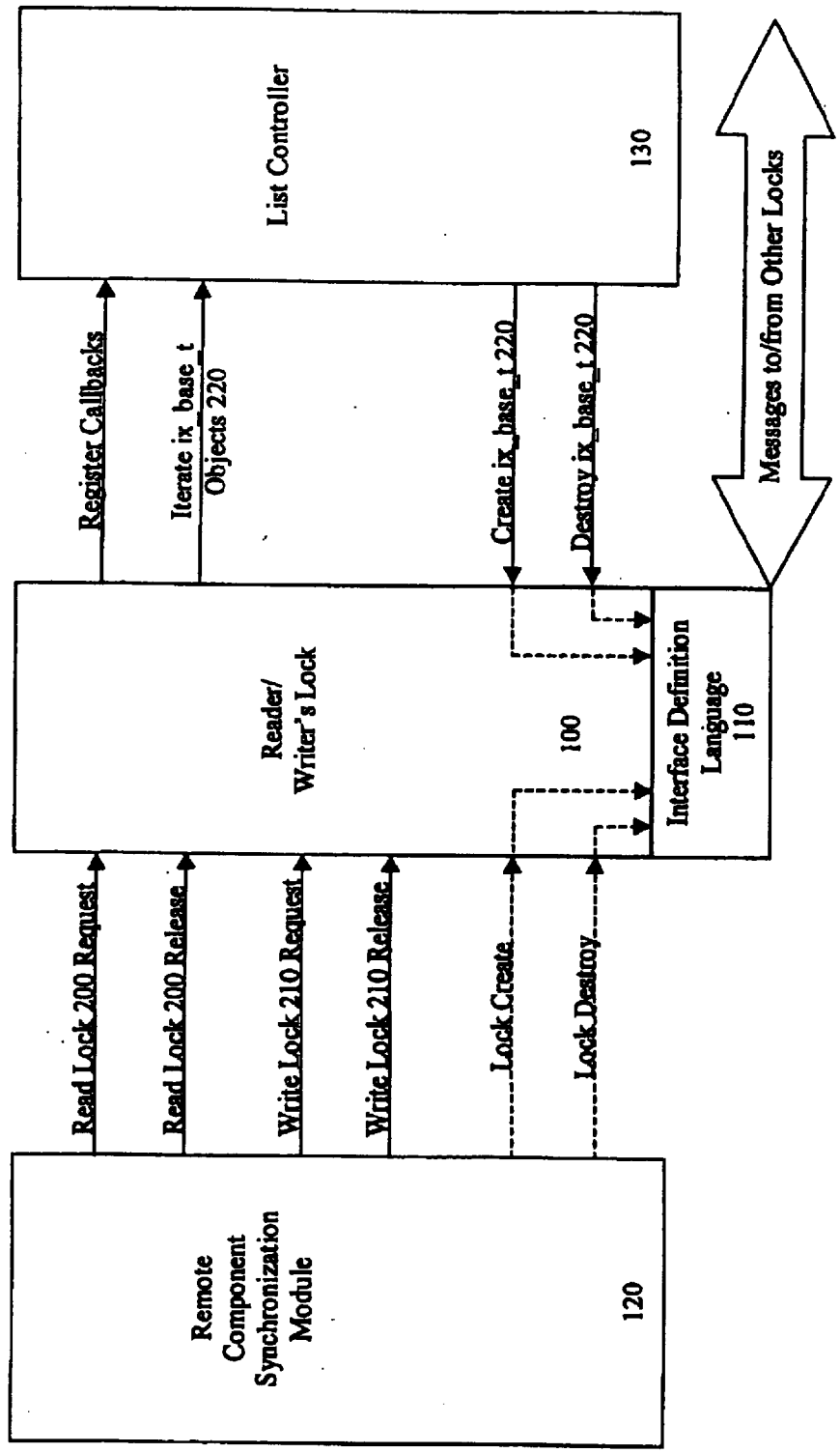
FIG. 2 is a block diagram of the reader and writer's lock function interface, according to an embodiment of the present invention.

According to one embodiment of the present invention, as illustrated in FIG. 1 and FIG. 2, the distributed reader and writer's lock 100 communicates over an interface definition language interface 110 or similar language interface. A remote component synchronization module 120 creates the distributed reader and writer's lock 100. The remote component synchronization module 120 acts as an agent for the object management system component 140. The distributed reader and writer's lock 100 exposes functions to request a read lock 200 and release a read lock 200 and to request a write lock 210 and release a write lock 210.

As seen from a system perspective, one remote component synchronization module 120 may have one write lock 210 at a time, although it may have several read locks 200. The write lock 210 is only granted to the remote component synchronization module 120 when all outstanding read locks 200 are released, and all outstanding read lock 200 requests are granted and released. The remote component synchronization module 120 that has the write lock 210 may acquire one or more read locks 200, but read lock 200 requests are blocked for other remote component synchronization modules 120 until the write lock 210 is released. In the absence of a write lock 210, any remote component synchronization module 120 may acquire one or more read locks 200.

The distributed reader and writer's lock 100 communicates with corresponding locks on other object management systems through ix_ring objects, which function as ring buffers. The code that marshals the message data and that sends and receives data from the rings is interface definition language 110 generated. The code encapsulates the ix_ring and interface information into an ix_base t object 220.

In the Internet Exchange Architecture ("IXA") system, the functions that support incoming messages are known as skeleton functions, while those that support outgoing messages are referred to as stub functions. A single interface definition language interface 110 uses only one ix_base_t object 220 to support the skeleton interface and one ix_base_t object 220 for each connected object management system to support the stub interface.

The distributed reader and writer's lock 100 manages the ix_base_t object 220 that handles the skeleton interface. The distributed reader and writer's lock 100 offloads management of the stub interface to a list controller 130 and provides two callback functions while registering as a client of the list controller 130. The creation and partial initialization of an ix_base_t object 220 as a stub interface to a new object management system being connected to the system is one such function. The initialization is performed by the interface definition language 110 generated stub initialization function. The other function is the clean up and destruction of an ix_base_t object 220 when an object management system is disconnected from the system. The clean up is performed by the interface definition language 110 generated stub clean-up function. The distributed reader and writer's lock 100 does not track the active ix_base_t objects 220 because the list controller 130 provides a function to iterate through all of the lock's current ix_base_t stub objects. The list controller 130 further maintains a communications list 150 and is connected to the communications controller 160. The Application Program Interfaces ("API") presented to the remote component synchronization module 120 are synchronous. APIs are sets of routines, protocols, and tools for building software applications. An API thus serves as a programmatic interface for interprogram communications or for interfacing between protocol layers.

When the remote component synchronization module 120 makes a read 200 or write lock 210 request, the function does not return until the lock is acquired. Since all incoming messages are received in the same ix_base_t object 220, including replies to requests sent by the local object management system, the skeleton code must not block for an indeterminate period. Because of this, the distributed reader and writer's lock 100 runs the skeleton code in a separate thread. Using a thread protection mutex in the skeleton code is acceptable, whereby the mutex is a program object that allows multiple program threads to share the same resource, but not simultaneously.

A remote object management system may request a write lock 210 when the local object management system has a read lock 200. An object management system does not know of the status of read locks 200 on other object management systems. Since the time that a read lock 200 may be held is undetermined, it follows that the skeleton code cannot be synchronous. That is, if a write lock 210 request is received from another object management system, the skeleton code may not wait until the read lock 200 is released. Thus, the local object management system must respond with a callback to the requesting object management system when the lock becomes available.

Each distributed reader and writer's lock 100 module contains a reader and writer's lock component, wherein the write lock 210 may be adjusted through the interface definition language interface 110. That is, only a remote module may set the lock, and a separate variable maintains the state of the local write lock 210. The reason for this is that the module must grant local read locks 200 if the write lock 210 is local, yet read lock 200 requests are blocked if a remote module has the write lock 210.

Algorithms are employed to describe the main flow only. For instance, timeout handling is not shown. Wherever a timeout can occur, a step is repeated up to the number of retries set during initialization. Should a timeout still occur, the function returns with a timeout indicator set. If the function detects an error, it returns the error to the remote component synchronization module 120 that is using the standard ix_error encapsulation facilities provided by an action services library.

FIG. 2 illustrates the distributed reader and writer's lock 100 function interface. It depicts the read lock 200 request, read lock 200 release, write lock 210 request, and write lock 210 release as originating at the remote component synchronization module 120 and extending to the distributed reader and writer's lock 100. A lock create and lock destroy similarly originate at the remote component synchronization module 120 and extend to the distributed reader and writer's lock 100 into the interface definition language interface 110. The create ix_base_t 220 function and the destroy ix_base_t 220 function are shown as stemming from the list controller 130 to the distributed reader and writer's lock 100 into the interface definition language interface 110. From the distributed reader and writer's lock 100 to the list controller 130, extends the register callbacks function and the iterate ix_base_t objects 220 function. In addition, the interface definition language interface 110 receives messages from other locks as well as sends messages to other locks.

Figure 3A:
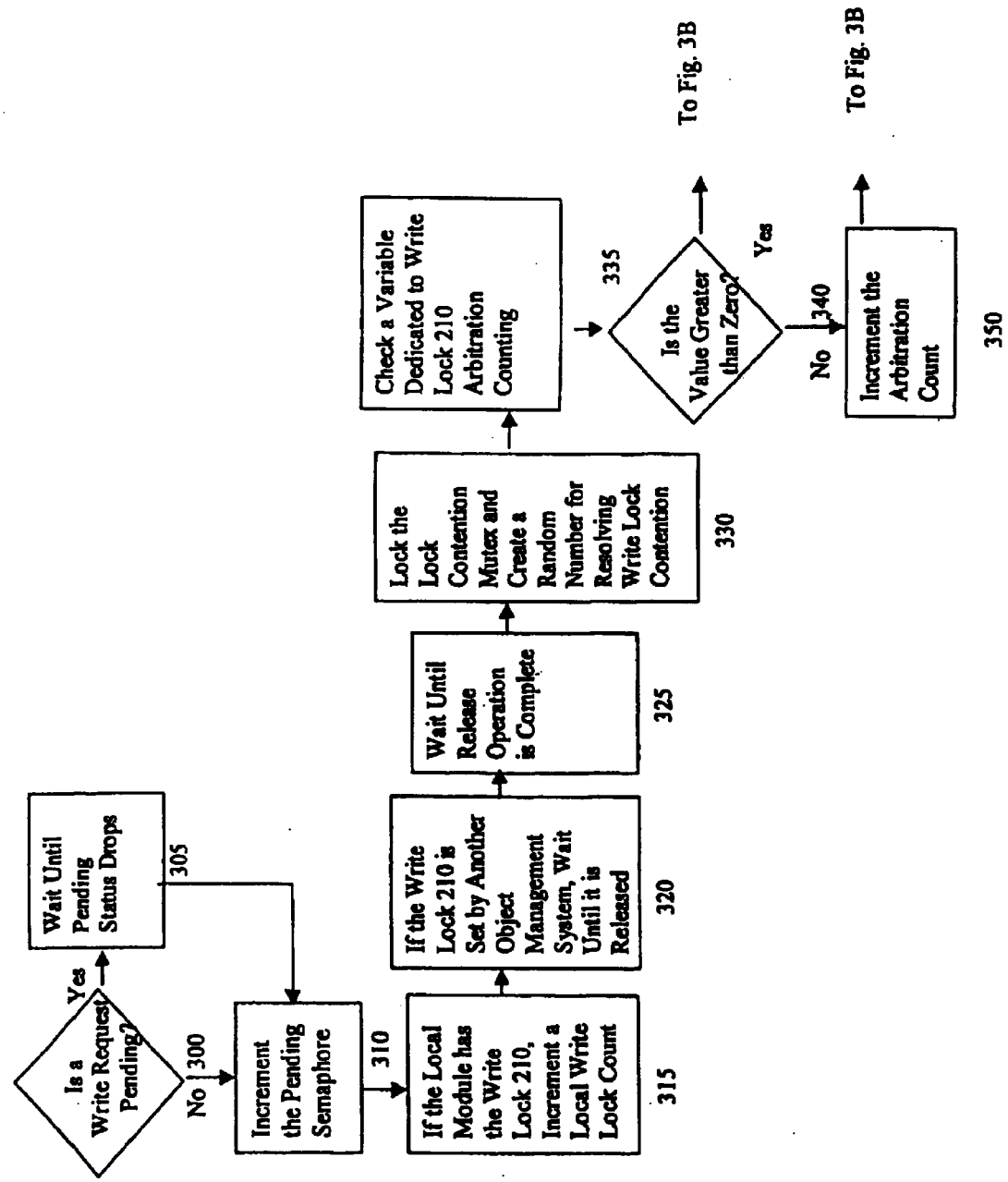
FIG. 3A and FIG. 3B together form a flowchart showing the operations involved in a local write lock request, according to an embodiment of the present invention.
Figure 3B:
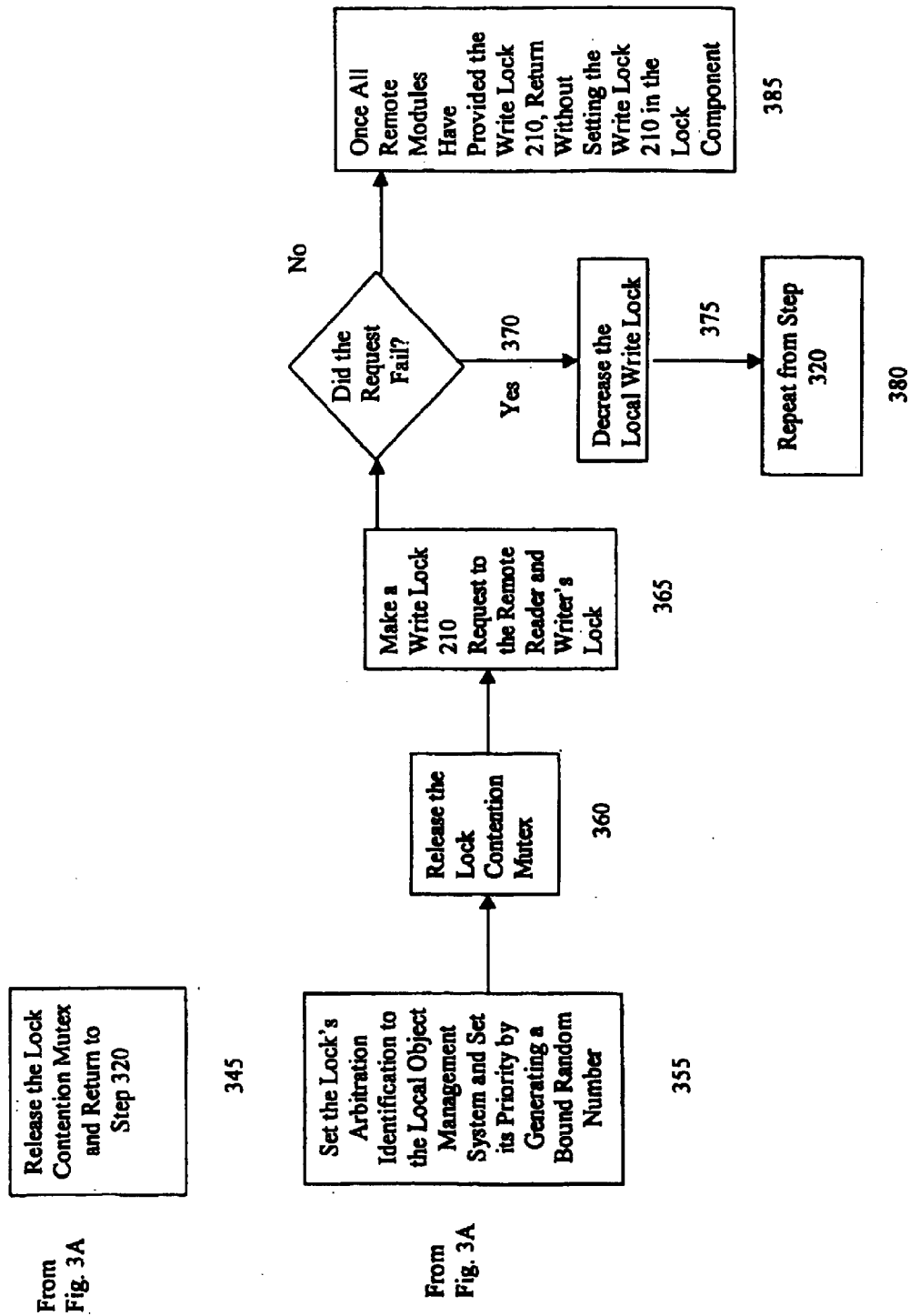

FIG. 3 shows the operations involved in making a local write lock 210 request. If a write request is already pending, as questioned in operation 300, the system must wait until its pending status drops, as depicted in operation 305, and then increment the pending semaphore and continue, as shown in operation 310. That is, the semaphore operates as a variable with a value that indicates the status of common resource. It locks the resource that is being used. The process needing the resource checks the semaphore to determine the resource's status and then decides how to proceed. As described in operation 315, if the local module already has the write lock 210, then the system increments a local write lock 210 count. If the write lock 210 is set by another object management system, the system must wait, as illustrated in operation 320, for it to be released. If an object management system has just released its local lock and is in the process of sending the release to remote object management systems, as shown in operation 325, the system must wait until the release option is complete. A clear-pending lock is employed here. Next, as depicted in operation 330, the lock contention mutex is locked and a random number is created for resolving write lock 210 contention. As shown in operation 335, the system then checks a variable dedicated to write lock 210 arbitration counting. If the value is greater than zero, a request has been received by a remote object management between operations 320 and 325. As such, the lock contention mutex is released and the flow returns to operation 320. Otherwise, the arbitration count is incremented, as illustrated in operation 350. As described in operation 355, the lock's 210 arbitration identification is set to the local object management system identification. Its priority is also set through the generation of a bound random number. The lock contention mutex is then released, as shown in operation 360. For each connection returned through an iterator provided by the list controller 130, a write lock 210 request is made to the remote reader and writer's lock, as illustrated in operation 365. Operation 370 then examines whether the request failed. If a request fails because of contention in a remote module, the local write lock count is decremented, as shown in operation 375, and the process repeats from operation 320, as shown in operation 380. Instead of creating a new random number for resolving write lock 210 contention, the request's priority is bumped beyond the upper boundary of the random number range. This guarantees that requests re-entering arbitration are afforded higher priority than new requests. The size of the random number generation range must be low enough to allow the arbitration to bump several times without integer overflow; enough to accommodate the maximum size of the pending request queue. If the request did not fail, as depicted in operation 385, when all remote modules have provided the write lock 210 to the requesting module, the process returns without setting the write lock 210 in the lock component. This allows the local module to grant read locks 200.

Figure 4:
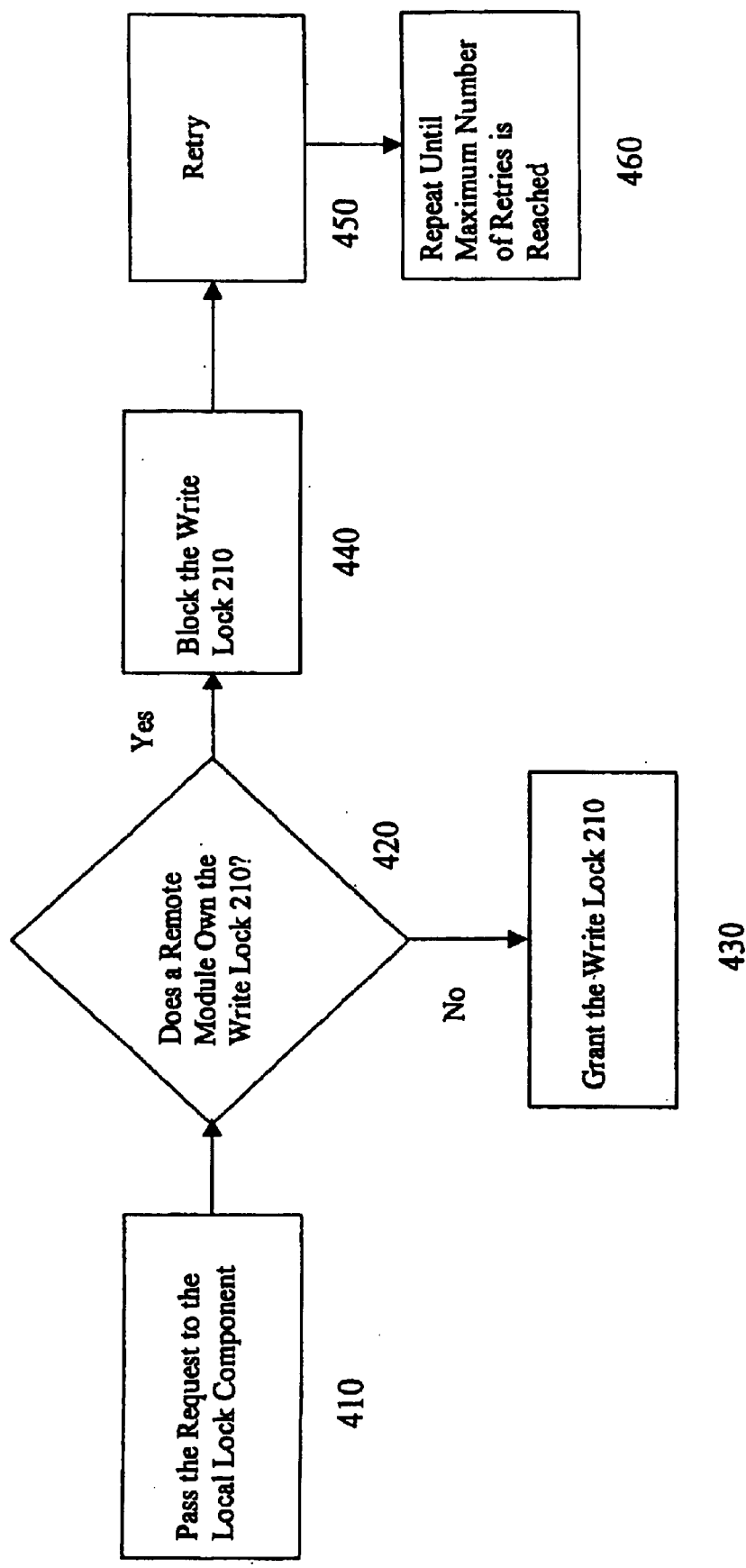
FIG. 4 is a flowchart showing the operations involved in a local read lock request, according to an embodiment of the present invention.

FIG. 4 shows the operations involved in making a local read lock 200 request. This function does not result in any request being passed over the interface definition language interface 110. The algorithm is as follows. As shown in operation 410, the request is sent to the local lock component. Operation 420 then examines whether a remote module owns the write lock 210. If a remote module does not own the write lock 210, the lock is granted, as shown in operation 430. If a remote module owns the write lock 210, as depicted in operation 440, the write lock 210 is blocked. Operation 450 shows that the request is then retried. If the available time for the request expires, as illustrated in operation 460, the process repeats until the maximum number of retries is reached.

Figure 5:
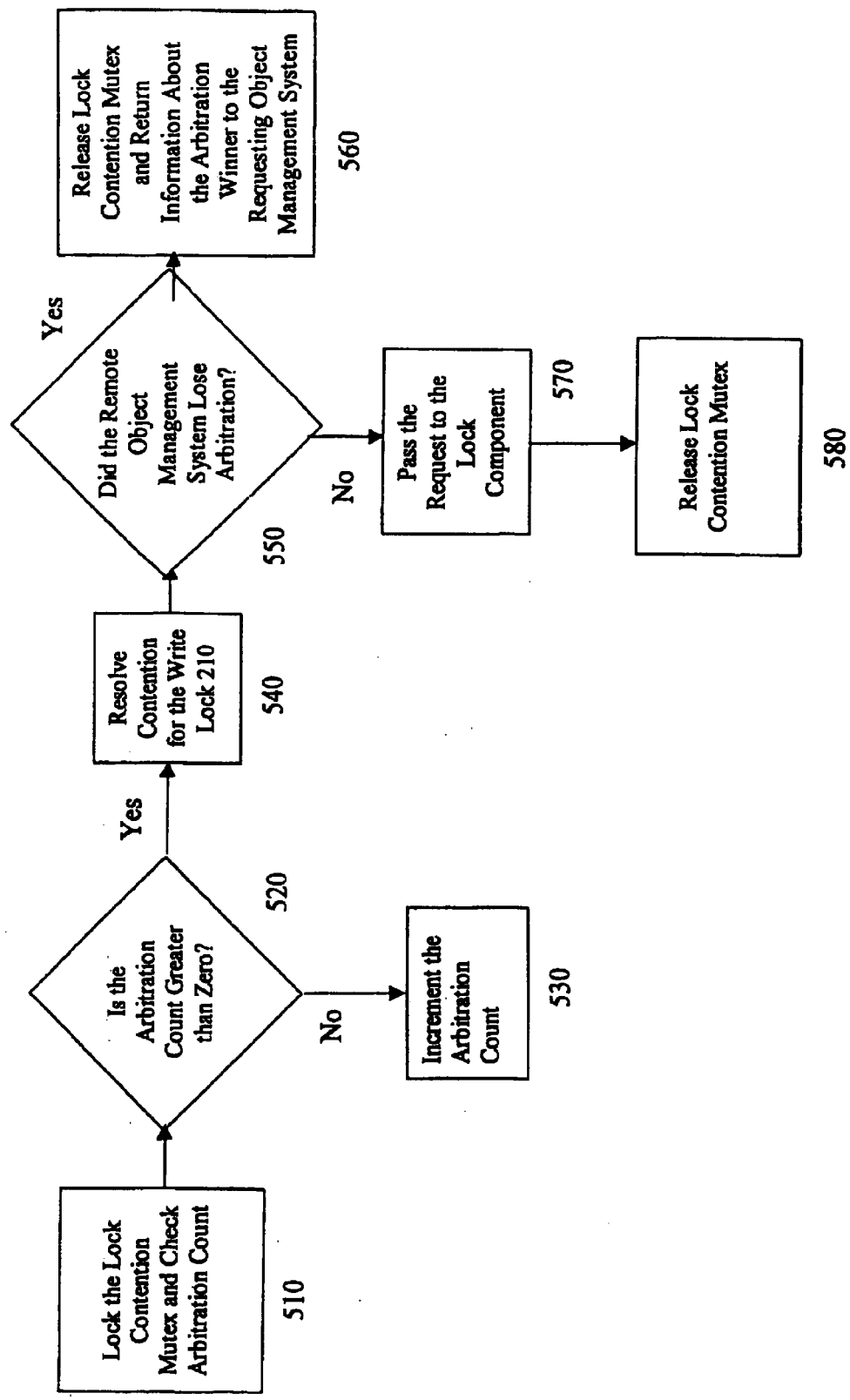
FIG. 5 is a flowchart depicting the operations involved in a remote write lock request, according to an embodiment of the present invention.

FIG. 5 shows the operations involved in making a remote write lock 210 request. This request is received over the interface definition language interface 110. Each lock module is responsible for ensuring that it never sends a request to remote object management systems if it already owns the write lock 210. Therefore, more than one call to this function without an intervening release of the write lock 210 will only occur during write lock 210 contention. This allows the ownership of the write lock 210 to be changed during the write contention interval, where the write contention interval is, the time it takes for the requesting module to be granted the write lock 210 by all other modules.

As shown in operation 510, the lock contention mutex is locked, and the arbitration count is checked. Operation 520 examines whether this value is greater than zero. If the value is not greater than zero, the count is incremented, as illustrated in operation 530. If the value is greater than zero, a request has been previously received. The contention for the write lock 210 must thus be resolved, as shown in operation 540. The resolve write lock contention function is called when a remote object management system requests a write lock 210, yet the write lock 210 contention variables, priority and identification, have either been set by a local request or by a previous invocation of the write lock 210 arbitration function.

The write lock 210 arbitration function assumes that a write lock 210 contention mutex has already been locked by the time that it has been called and that it will be unlocked after the function has returned. The arbiter examines the values of priority and identification. If the requested priority is different than the current priority, the arbitration winner is decided by priority. Otherwise, the arbiter decides the winner based on object management system identification. It is required that each object management system in a multiple object management system has a unique identification. If the arbitration winner is the remote object management system, the contention variables in the local lock are changed, and the arbitration fields passed by the remote object management system are returned unchanged. In contrast, if the object management system already specified in the local arbitration prevails, the local variables are left unchanged, and the arbitration fields are fixed to the values in the local variables.

Operation 550 examines whether the remote object management system prevailed in arbitration. As shown in operation 560, if the remote object management system loses arbitration, the lock contention mutex is released and information about the arbitration winner to the requesting object management system is returned. Otherwise, as illustrated in operation 570, the request is sent to the lock component, which will block until all outstanding read locks 200 are released. The lock contention mutex is then released, as depicted in operation 580. The operations outlined above cannot be executed in one function because remote requests are received in the interface definition language skeleton code, which must not block for an indeterminate period. Therefore, the incoming request must be asynchronous to the reply.

Figure 6:
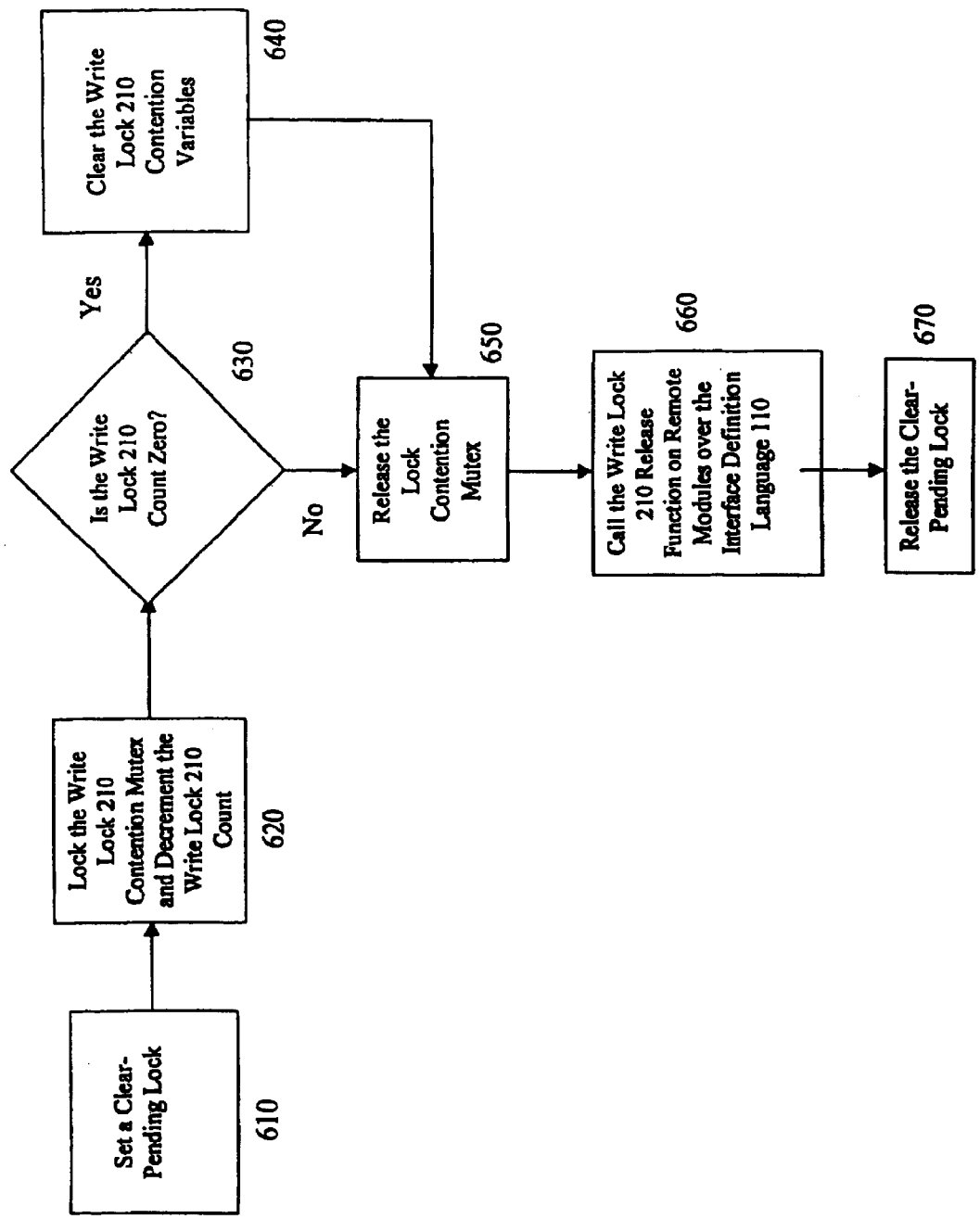
FIG. 6 is a flowchart showing the operations involved in a local write lock release, according to an embodiment of the present invention.

FIG. 6 shows the operations involved in a local write lock 210 release. As shown in operation 610, a clear pending lock is set to prevent the local object management system from processing another request until the current lock has been released from all remote object management systems. The write lock 210 contention mutex is then locked and the write lock 210 count is decremented, as illustrated in operation 620. Operation 630 then examines whether the write lock 210 count is zero. If the write lock 210 count is zero, as shown in operation 640, the write lock 210 contention variables, identification and priority, must be cleared. Otherwise, some other module on the local object management system has a write lock 210. In that case, the lock contention mutex must be released, as depicted in operation 650. Operation 660 describes the calling of the write lock 210 release functions on remote modules over the interface definition language interface 110. This is achieved in two stages—one to clear the arbitration variables in the remote object management systems and one to enable arbitration for the next request. Otherwise, in a system of three or more object management systems, a remote object management system could arbitrate against stale arbitration values. The clear pending lock is then released, as shown in operation 670.

In an alternative embodiment, the local write lock 210 count and arbitration count can be combined into one variable. That is, the skeleton write lock 210 release code can be consolidated into a single stage process, thereby reducing inter-object management system message traffic. This version requires the lock to keep the history of the arbitration variables for the last owner of the write lock 210. The arbitration function would require that if the same object management system is re-arbitrating for the lock after having owned the previous lock, then the random number it uses to generate its arbitration priority may not be the same as the number it used previously. During arbitration, an object management system can detect that the arbitration variables are stale and adjust the arbitration and write lock 210 state accordingly. This optimization is complicated by the notion that the write lock 210 release for the old lock and the next request may appear out of order if there are more than two object management systems. If the code is not written carefully, an object management system receiving out of sequence release and request messages would be excluded from the opportunity of participating in the arbitration contest.

Figure 7:
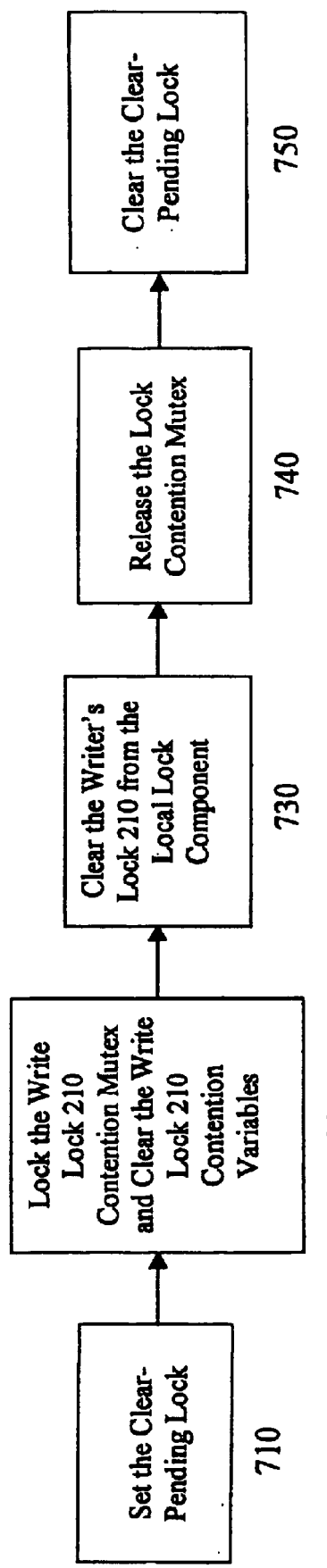
FIG. 7 is a flowchart showing the operations involved in a remote write lock release, according to an embodiment of the present invention.

FIG. 7 shows the operations involved in a remote write lock 210 release. As explained in the preceding section, this activity occurs in two stages. First, as described in operation 710, the clear pending lock is set to prevent the local object management system from processing another request until the current lock has been released from all remote object management systems. The write lock 210 contention mutex is then locked and the write lock 210 contentions variables, write identification and priority, are cleared, as shown in operation 720. The writer's lock 210 is then cleared from the local lock component, as illustrated in operation 730. The lock contention mutex is released, as described in operation 740. In the second stage, the clear pending lock is cleared, as shown in operation 750. The second stage occurs after the owner of the write lock 210 on all connected object management systems has performed the first stage.

While the above description refers to particular embodiments of the present invention, it will be understood to those of ordinary skill in the art that modifications may be made without departing from the spirit thereof. The accompanying claims are intended to cover any such modifications as would fall within the true scope and spirit of the embodiments of the present invention.

The presently disclosed embodiments are therefore to be considered in all respects as illustrative and not restrictive; the scope of the embodiments of the invention being indicated by the appended claims, rather than the foregoing description. All changes that come within the meaning and range of equivalency of the claims are therefore intended to be embraced therein.

What is claimed is:

1. A system to synchronize object management systems having a plurality of object management system components, comprising:

a distributed reader and writer's lock for each of the plurality of object management system components that communicates over a language interface and controls access to information shared by a corresponding object management system component within multiple object management systems;

a module that creates the distributed reader and writer's lock and serves as an agent for the object management system component; and a list controller, which maintains a communications list and is adapted for communication with a communications controller, to which the distributed reader and writer's lock offloads management of a stub interface; wherein the distributed reader and writer's lock functions to:

request a local read lock and release a read lock;

request a local write lock and release a local write lock; and request a remote write lock and release a remote write lock.

2. The system of claim 1, wherein each distributed reader and writer's lock communicates with corresponding locks on other object management systems through an ix_ring object that serves as a ring buffer.

3. The system of claim 1, wherein the distributed reader and writer's lock provides two callback functions while registering as a client of the list controller.

4. The system of claim 3, wherein one callback function is the creation and initialization of an ix_base_t object as a stub interface to a new object management system being connected to the system.

5. The system of claim 4, wherein the language interface performs the initialization of the ix_base_t object generated stub initialization function.

6. The system of claim 3, wherein one callback function is the clean up and destruction of an ix_base_t object when an object management system is disconnected from the system.

7. The system of claim 6, wherein the language interface performs the clean up of the $ix_{13} base_{13} j$ object generated stub clean up function.

8. The system of claim 1, wherein the module may have only one write lock at a time and several read locks.

9. The system of claim 8, wherein the write lock is granted to the module upon a release of all outstanding read locks and a grant and release of all outstanding read lock requests.

10. The system of claim 1, wherein the language interface uses an ix_base_t object to support a skeleton interface, which supports an incoming message, and an ix_base_t object to support the stub interface, which supports an outgoing message.

11. The system of claim 1, wherein the list controller provides a function to iterate through the distributed reader and writer's lock ix_base_t objects.

* * * * *